United States Patent
Corvino et al.

(10) Patent No.: US 11,856,048 B2
(45) Date of Patent: *Dec. 26, 2023

(54) SYSTEM AND METHOD FOR DEFERRING DATA RETRIEVAL

(71) Applicant: ServiceNow, Inc., Santa Clara, CA (US)

(72) Inventors: Alexander Corvino, San Diego, CA (US); Kyly Gabriel Vass, San Diego, CA (US); Nikhil Nitin Dvivedi, San Diego, CA (US); Roger Lee Hagen, Mason, IL (US); Yasser Khaled Hamed, San Jose, CA (US); Natallia Rabtsevich Rodriguez, San Diego, CA (US); Kyle Alexander Simon, Vista, CA (US); Andrew Kian Samii, San Diego, CA (US); Stuart Dean Swope, San Diego, CA (US); Jerry Lee Coe, Murrieta, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,440

(22) Filed: Nov. 3, 2022

(65) Prior Publication Data

US 2023/0247082 A1 Aug. 3, 2023

Related U.S. Application Data

(63) Continuation of application No. 17/591,367, filed on Feb. 2, 2022, now Pat. No. 11,522,943.

(51) Int. Cl.
*H04L 67/02* (2022.01)
*G06F 16/957* (2019.01)

(52) U.S. Cl.
CPC .......... *H04L 67/02* (2013.01); *G06F 16/9574* (2019.01)

(58) Field of Classification Search
None
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,610,512 B2 | 10/2009 | Gerber |
| 7,617,073 B2 | 11/2009 | Trinon |
| 7,689,628 B2 | 3/2010 | Garg |

(Continued)

*Primary Examiner* — Quang N Nguyen
(74) *Attorney, Agent, or Firm* — FLETCHER YODER PC

(57) ABSTRACT

A server receives a first hypertext transfer protocol (HTTP) from a client device that requests first and second items of content associated with a webpage and applies a defer directive to the second item. The server retrieves, from a database, via a single worker thread, first data associated with the first item and transmits a first message comprising the first data associated with the first item. The server retrieves, from the database, via the worker thread, second data associated with the deferred item and transmits a second message comprising the second data associated with the second item.

20 Claims, 9 Drawing Sheets

(56) References Cited

U.S. PATENT DOCUMENTS

| | | |
|---|---|---|
| 7,716,353 B2 | 5/2010 | Golovinsky et al. |
| 7,769,718 B2 | 8/2010 | Murley et al. |
| 7,783,744 B2 | 8/2010 | Garg |
| 7,890,802 B2 | 2/2011 | Gerber |
| 7,925,981 B2 | 4/2011 | Pourheidari et al. |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota et al. |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon et al. |
| 8,620,994 B2 * | 12/2013 | Boyd .................. H04L 67/62 709/224 |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller et al. |
| 8,887,133 B2 | 11/2014 | Behnia |
| 9,065,783 B2 | 6/2015 | Ding |
| 9,098,322 B2 | 8/2015 | Apte et al. |
| 9,122,552 B2 | 9/2015 | Whitney |
| 9,239,857 B2 | 1/2016 | Trinon |
| 9,271,241 B2 * | 2/2016 | Kenney .................. H04L 5/0053 |
| 9,317,327 B2 | 4/2016 | Apte |
| 9,342,520 B2 | 5/2016 | Joel |
| 9,342,620 B2 * | 5/2016 | Joel .................. H04L 61/4511 |
| 9,363,252 B2 | 6/2016 | Mueller et al. |
| 9,535,737 B2 | 1/2017 | Joy |
| 9,557,969 B2 | 1/2017 | Sharma |
| 9,645,833 B2 | 5/2017 | Mueller et al. |
| 9,766,935 B2 | 9/2017 | Kelkar et al. |
| 9,792,387 B2 | 10/2017 | George |
| 9,805,322 B2 | 10/2017 | Kelkar |
| 10,521,195 B1 | 12/2019 | Swope et al. |
| 11,032,213 B1 | 6/2021 | Hussain et al. |
| 2014/0281918 A1 | 9/2014 | Wei et al. |
| 2014/0323164 A1 * | 10/2014 | Nakajima ............ H04W 24/08 455/458 |
| 2015/0046789 A1 * | 2/2015 | Wei .................. G06F 40/14 715/234 |
| 2015/0088970 A1 * | 3/2015 | Wei .................. H04L 67/01 709/203 |
| 2015/0088975 A1 | 3/2015 | Wei et al. |
| 2019/0196789 A1 | 6/2019 | Bucchi et al. |
| 2019/0196890 A1 | 6/2019 | Bucchi et al. |
| 2019/0332451 A1 | 10/2019 | Tamjidi et al. |
| 2019/0340287 A1 | 11/2019 | Tamjidi et al. |
| 2020/0089478 A1 | 3/2020 | Nelson et al. |
| 2020/0341994 A1 | 10/2020 | Tamjidi et al. |
| 2020/0389543 A1 | 12/2020 | Swope et al. |
| 2021/0173888 A1 | 6/2021 | Flack et al. |
| 2021/0248114 A1 | 8/2021 | Tamjidi et al. |

* cited by examiner

```
1  #!/bin/bash
2
3  curl --request POST "http://localhost:8080/api/now/graphql" \
4  --header 'Accept: multipart/mixed' \          600
5  --header 'Authorization: Basic YWRtaW46YWRtaW4=' \
6  --header 'Content-Type: application/json' \
7  --data-raw '{"query": "{ now {test{ ... @defer {name} }}}" \
       602            502      504        508   506
```

Terminal:  Local x  curl-form-query.sh x  +

~/git/demo-deferred-graphql-request/scripts(master) » /bin/bash /Users/yasser.hamed/git/demo-deferred-graphql-request/scripts/curl-form-query.sh

---

Content-Type: application/json

{"data":{"now":{"test":{}}}}   604

---

Content-Type: application/json

{"data":{"name":"Yasser"},"hasNext": false, "path": ["now", "test"]}   512

*FIG. 7*

```
john.doe@MSANB317DB1B demo-deferred-graphql-request % node streamedFormQuery.js
[20.05.2021 11:36.04.416] [LOG]  [0, 617]  ← 902
john.doe@MSANB317DB1B demo-deferred-graphql-request % node formQuery.mjs john.doe@MSANB317DB1B demo-deferred-graphql-request % node formQuery.mjs
[20.05.2021 11:37.20.986] [LOG]  Starting request...
[20.05.2021 11:37.21.212] [LOG]  statusCode:200
[20.05.2021 11:37.21.213] [LOG]  Processing request...
[20.05.2021 11:37.21.218] [LOG]  — Part #1 —
Content-type: application/json
Body part: ROOT

[20.05.2021 11:37.21.601] [LOG]  — Part #2 —
Content-type: application/json
Body part: GlideViewQuery_Query.uiView.glideLayoutItem__query.GlideLayout_Query.formLayout.relatedLists
                                                         904
[20.05.2021 11:37.21.604] [LOG]  [0, 234, 631] ← 906
john.doe@MSANB317DB1B demo-deferred-graphql-request %
```

*FIG. 10*

SYSTEM AND METHOD FOR DEFERRING DATA RETRIEVAL

CROSS-REFERENCE TO RELATED APPLICATION

This application is a continuation of U.S. patent application Ser. No. 17/591,367, filed Feb. 2, 2022, and entitled, "SYSTEM AND METHOD FOR DEFERRING DATA RETRIEVAL," issued as U.S. Pat. No. 11,522,943 on Dec. 6, 2022, which is incorporated by reference herein in its entirety for all purposes.

BACKGROUND

The present disclosure relates generally to delivering webpage or application content to a client device across a network, and more specifically to improving time to first response for a webpage or application.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

In such cloud-based architectures, a web browser is often used on the client side to access cloud-based applications and resources. When a user navigates to a page within a web browser or native application that includes a large amount of underlying data to be retrieved, the server waits to send a response until all of the data has been retrieved, resulting in pages that are slow to load. Further, because a user cannot interact with the page until the request has been completed, the time to first interaction equals or slightly exceeds the time to complete the request. Accordingly, a way to improve time to first interaction for pages is desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes techniques for improving time to first interaction for a webpage or a page of an application by utilizing a defer directive to defer retrieval of some of the requested data. A client device transmits a hypertext transfer protocol (HTTP) request, opening an HTTP connection with a server. The HTTP request identifies items to be retrieved and uses the defer directive to indicate that retrieval of at least one of the items is to be deferred. The server retrieves the one or more non-deferred items and responds to the client device with a message that includes the retrieved data for the non-deferred items. The client device partially loads the page based on the received data for the non-deferred items. The server retrieves the deferred items and transmits the retrieved data associated with the deferred items to the client device via messages as the data is retrieved. The client device updates the page with received data as subsequent messages are received. When all of the messages have been sent and the request has been completed, the HTTP connection is closed.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 5 is a flow diagram illustrating a process that occurs when a client device navigates to a webpage or a page of an application using a defer directive, in accordance with aspects of the present disclosure;

FIG. 7 illustrates the example HTTP requests and responses of FIG. 6 in client uniform resource locator (cURL), in accordance with aspects of the present disclosure;

FIG. 10 is a command line interface window that illustrates response times to similar GraphQL queries with and without the defer directive, in accordance with aspects of the present disclosure.

DETAILED DESCRIPTION

Figure 1:
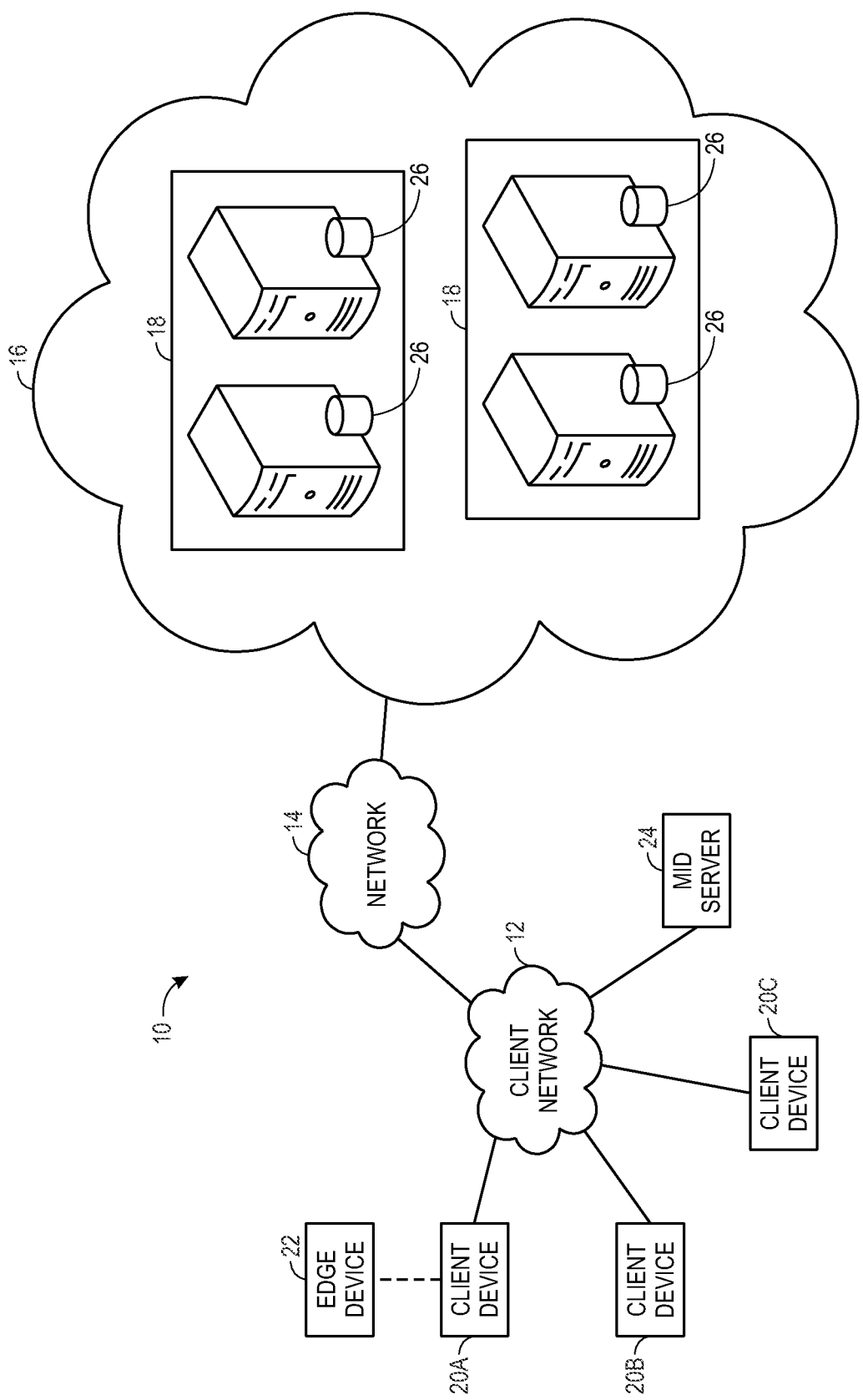
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

The present disclosure includes techniques for improving time to first interaction for a webpage or a page of an application by utilizing a defer directive to defer retrieval of some of the requested data. A client device transmits a hypertext transfer protocol (HTTP) request, opening an HTTP connection with a server. The HTTP request identifies items to be retrieved and uses the defer directive to indicate that retrieval of at least one of the items is to be deferred. For example, the HTTP request may be a GraphQL request. The server utilizes a single worker thread from a worker thread pool to retrieve the one or more non-deferred items and responds to the client device with a multipart/mixed format message that includes the retrieved data for the non-deferred items. The client device may partially load the page based on the received data for the non-deferred items. The server then utilizes the single worker thread to retrieve the deferred items in serial and stream the retrieved data associated with the deferred items to the client device via one or more respective multipart/mixed format messages as the data is retrieved. The client device may update the page with received data as subsequent messages are received. In some embodiments, the messages may include an indication of whether or not additional messages will be sent, or if the request has been completed. When all of the messages have been sent and the request has been completed, the HTTP connection is closed.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT)

devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
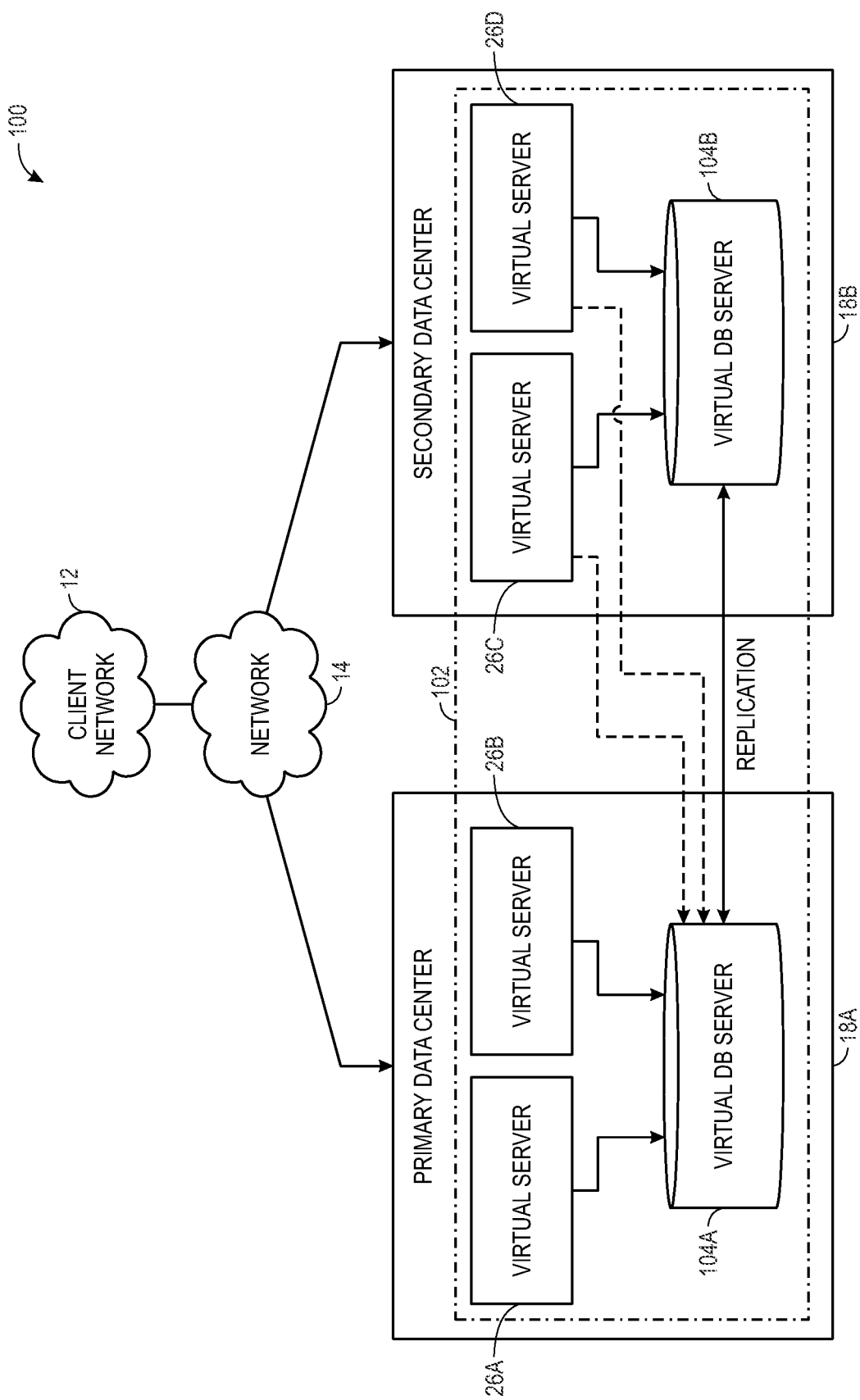
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
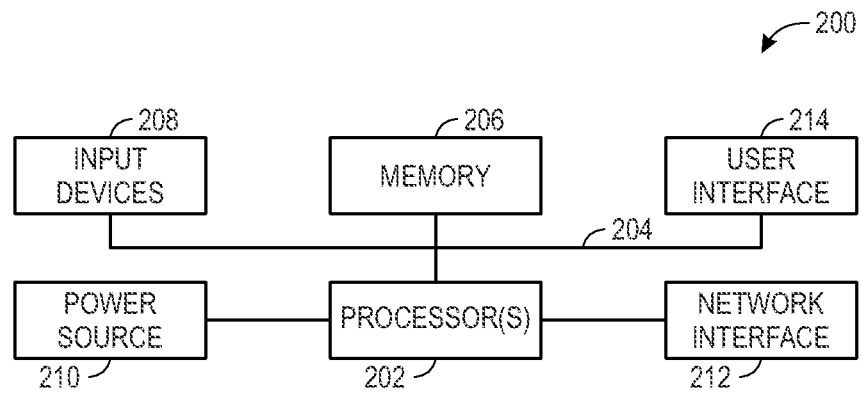
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
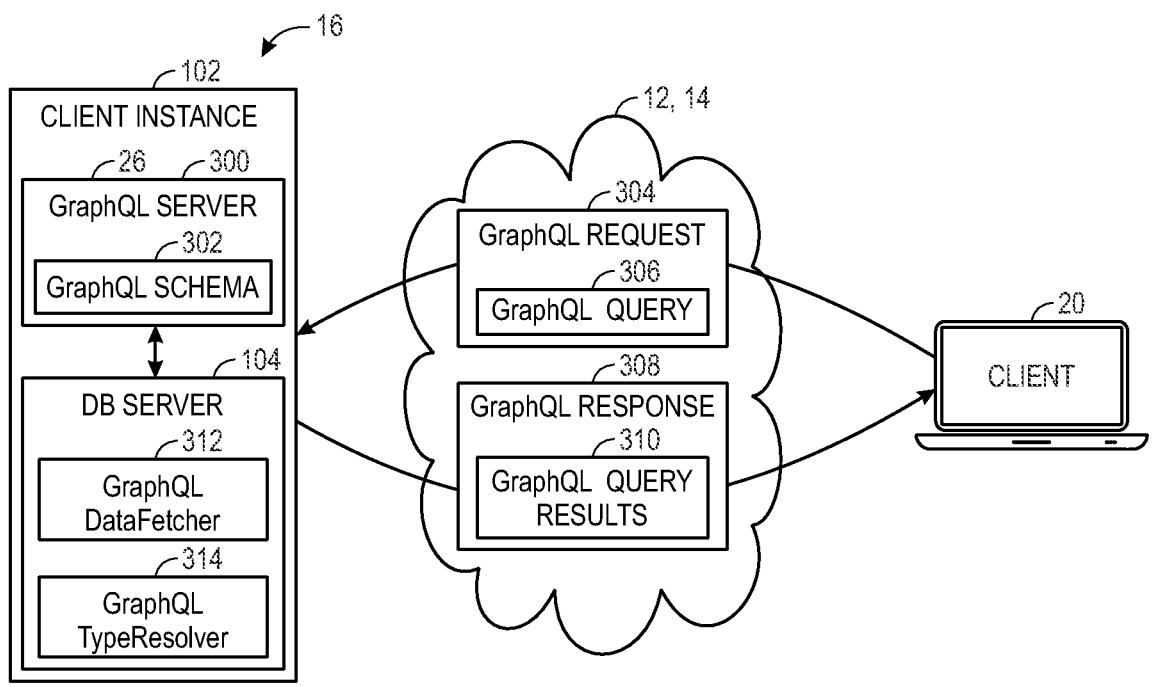
FIG. 4 is a block diagram illustrating a virtual server and a database server supporting and enabling a client instance, according to one or more disclosed embodiments, in accordance with aspects of the present disclosure.
Figure 3:
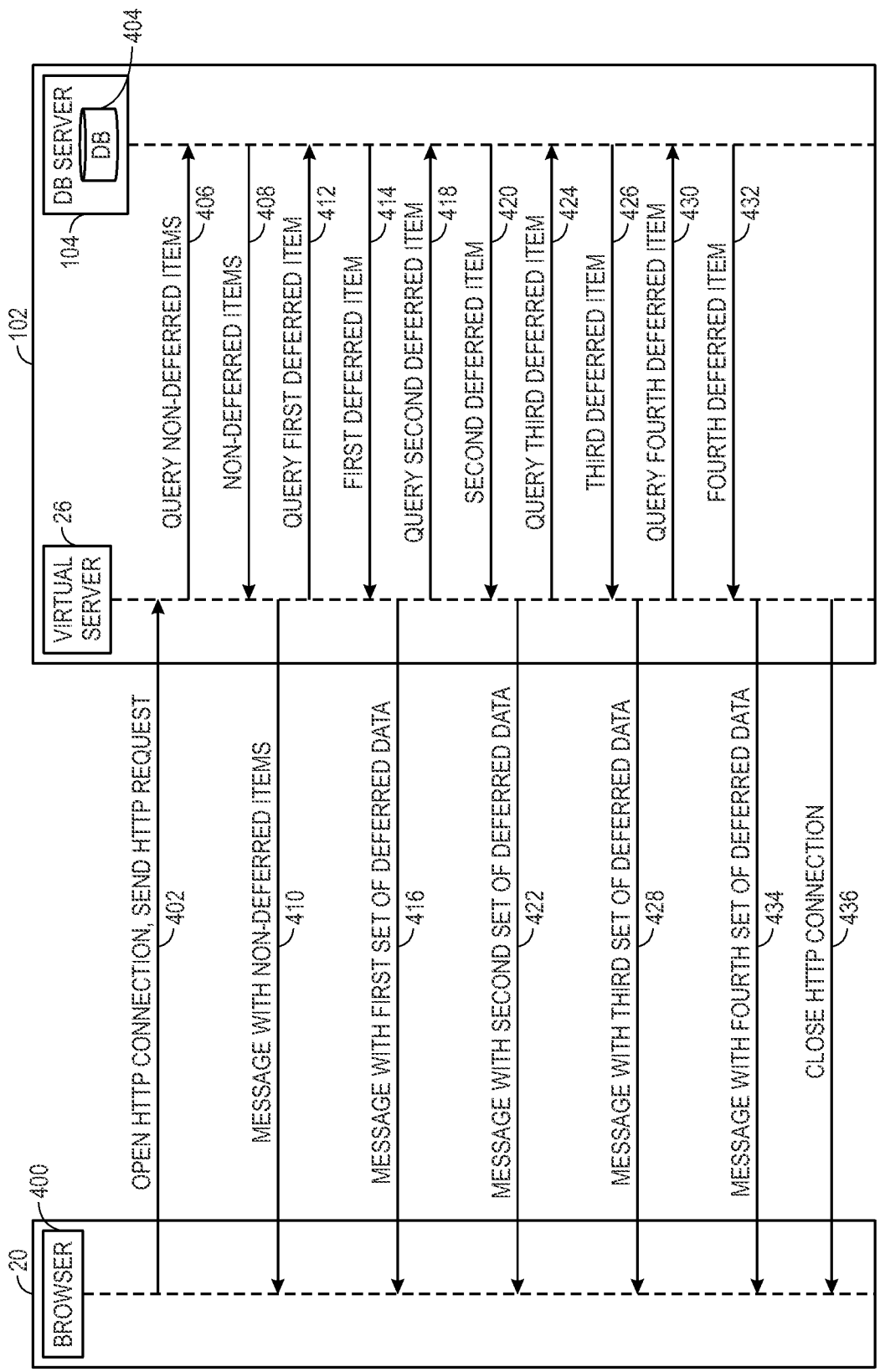

With the preceding in mind, FIG. 4 is a block diagram illustrating an embodiment in which a virtual server 26 and a database server 104 support and enable the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the networks 14 and 12 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

More specifically, the virtual server 26 of the illustrated client instance 102 includes a GraphQL server 300 that hosts a GraphQL schema 302 that describes data stored by the database server 104. The GraphQL server 300 is generally designed to receive a GraphQL request 304 that includes one or more GraphQL queries 306, and then to execute the received queries against the GraphQL schema 302 to retrieve data from the database server 104. In response to executing the received GraphQL query 306, the GraphQL server 300 is designed to generate a corresponding GraphQL response 308 that includes GraphQL query results 310, which are returned to the requesting device (e.g., client device 20). While the GraphQL request 304 is indicated as being received from the client device 20 for the illustrated embodiment, in other embodiments, the GraphQL request 304 may be received from an application hosted by another virtual server 26 of the client instance 102, from the GraphQL server 300 itself, or another suitable device.

Additionally, for the embodiment illustrated in FIG. 4, the database server 104 stores one or more GraphQL data-handling script tables, such as a GraphQL DataFetcher table 312 that is designed to store custom data-fetching scripts to retrieve and/or generate certain pieces of data within a GraphQL schema, as well as a GraphQL TypeResolver table 314 that is designed to store custom type-resolving scripts to determine the data type of fields of the GraphQL schema. It may be appreciated that the illustrated examples of GraphQL data-handling script tables is not intended to be limiting. Indeed, custom data-handling scripts can be defined to analyze, retrieve, and/or generate data pertaining to, or defined by, the GraphQL schema 302.

Typically, the client instance 102 responds to a GraphQL request 304 in a single GraphQL response 308 and waits to transmit the GraphQL response 308 until all of the data associated with a GraphQL request 304 (e.g., GraphQL query results 310) has been retrieved. Accordingly, when the GraphQL query results 310 includes a large amount of data, the page displayed on the client device 20 can be slow to load. Further, because a user cannot interact with the page until the request has been completed, the time to first interaction equals or slightly exceeds the time to complete the request. Accordingly, the present disclosure utilizes a defer directive to defer retrieval of flagged data, retrieve non-deferred data, return a message with the retrieved non-deferred data, at which point the client device can partially load the page, and the user can interact with the page. Subsequently, the deferred data can be retrieved and returned via messages once the data has been retrieved. Accordingly, though the time to complete an entire request using the disclosed techniques may be slightly longer than waiting until all of the requested data has been retrieved to transmit a response, the time to first interaction is much faster.

FIG. 5 is a flow diagram illustrating a process that occurs when the client device 20 navigates to a webpage or a page of an application using the defer directive. In order to simplify the description, present embodiments are described as a user navigating to and interacting with a webpage. However, it should be understood that embodiments are also envisaged in which the same techniques are used when a user navigates to, navigates within, or otherwise interacts with, a native software application, a mobile application, a web application, and so forth. Accordingly, the disclosed techniques are not intended to be limited to use with a traditional webpage accessed via a web browser. A user input provided (e.g., via a user interface of the client device 20, such as clicking on a hyperlink, selecting a navigation button, providing a uniform resource locator (URL), providing a query, providing a character string to a search bar, and so forth) causes a browser 400 generate and transmit an HTTP request 402 (e.g., a GraphQL request), opening an HTTP connection with a virtual server 26 (e.g., GraphQL server 26) that itself stores a database 404, or has access to a database server 104 that stores a database 404. For example, the requested page may contain a form containing lists (e.g., drop down lists) that are associated with large sets of data that are stored in the database 404 and are retrieved when the page loads. Though FIG. 5 illustrates the GraphQL server 26 acting as an intermediary between the client device 20 and the database server 104, in some embodiments, the client device 20 may interact directly with the database server 104.

The HTTP request includes one or more instances of a defer directive (e.g., "@defer") and specifies (e.g., in a header of the HTTP request or the body of the HTTP request) that the response may be one or more multipart/mixed format messages. The defer directive is a custom GraphQL directive that flags specific items in the HTTP request as deferred such that the virtual server 26 retrieves the non-deferred items and returns the non-deferred items to the client device 20 before retrieving the deferred items. A multipart/mixed message is an HTTP message that may include multiple parts and may include multiple data types or have multiple data types attached. The various parts of the message are delineated by boundaries, such as an alphanumeric text string disposed between various parts of a message. Typically, the boundary text string starts with a pair of hyphens ("--") and the final boundary concludes with a pair of hyphens ("--"). When data is attached to multipart/mixed format messages, the message text and the attachment become separate parts of the message, separated by boundaries. If there is no attachment, the message is said to be of a text/plain type and has only one part.

Once the virtual server 26 receives the HTTP request, at 406, the virtual server 26 utilizes a single worker thread from a thread pool to query the database 404 for the non-deferred data, which is returned at 408. Typically, GraphQL uses an asynchronous, multi-threaded approach to respond to requests. However, in the instant embodiment, to prevent a single request, or a small subset of requests, from dominating the available resources and using all of the available worker threads in the pool, a single respective worker thread is pulled from the pool and used to retrieve all of the data for a particular request. At 410, the virtual server 26 transmits a message to the client device 20 that includes the retrieved non-deferred data. For example, the message may be a multipart/mixed message having a first part that identifies the data, a boundary, followed by one or more parts with the attached data, and a final boundary to indicate the end of the message. In embodiments in which the attached data is separated into multiple parts, each of those respective parts may be separated by a boundary. The client device 20 may then partially load the page using the received non-deferred data.

Once the non-deferred items have been retrieved, the virtual server 26 utilizes the single worker thread to serially retrieve the deferred items and stream the deferred items to the client device 20. In the present embodiment, streaming data means that the retrieved data is continuously pushed by the virtual server 26 to the client device 20 as it is retrieved. In some embodiments, the deferred items may be retrieved in the order in which they appear in the request. However, in other embodiments, the virtual server 26 may reorder the deferred items such that the deferred items are serially retrieved in an order that is different from the order in which the deferred items appear in the request. For example, in such embodiments, deferred items may be arranged according to the expected time to retrieve the deferred items, the size of the deferred items, the location of the deferred items, the accessibility of the deferred items, and so forth.

Along these lines, it is envisaged that defer directives may be added to requests by users (e.g., sophisticated or "power" users). However, administrators may also include the defer directive in commonly submitted queries or requests without the knowledge of the requesting user. Further, in some embodiments, defer directives may be automatically added to requests (e.g., via machine learning, such as a trained neural network) when an item is requested that is known to be large, has historically taken a long time to retrieve, or is assessed by the machine learning heuristics as likely exceeding an acceptable retrieval response time threshold, such as based on one or both of characteristics of the query or of the data being accessed.

At 412, the virtual server 26 utilizes the worker thread to query the database 404 for the first item of deferred data, which is returned at 414. At 416, the virtual server 26 transmits a multipart/mixed message to the client device 20 that includes the first item of deferred data. For example, the message may have a first part that identifies the first item of deferred data, followed by one or more parts with the first item of deferred data. Each of the respective parts may be separated by a boundary, with the message concluding with a final boundary. The client device 20 may then update the page using the first item of deferred data.

At 418, the virtual server 26 utilizes the worker thread to query the database 404 for the second item of deferred data, which is returned at 420. At 422, the virtual server 26 transmits a multipart/mixed message to the client device 20 that includes the second item of deferred data. As with the message for the first item of deferred data, the message may have a first part that identifies the second item of deferred data, followed by one or more parts with the second item of deferred data. Each of the respective parts may be separated by a boundary, with the message concluding with a final boundary. The client device 20 may then update the page using the second item of deferred data.

At 424, the virtual server 26 utilizes the worker thread to query the database 404 for the third item of deferred data, which is returned at 426. At 428, the virtual server 26 transmits a multipart/mixed message to the client device 20 that includes the third item of deferred data. As with the messages for the previous items of deferred data, the message may have a first part that identifies the third item of deferred data, followed by one or more parts with the third item of deferred data. Each of the respective parts may be separated by a boundary, with the message concluding with a final boundary. The client device 20 may then update the page using the third item of deferred data.

At 430, the virtual server 26 utilizes the worker thread to query the database 404 for the fourth item of deferred data, which is returned at 432. At 434, the virtual server 26 transmits a multipart/mixed message to the client device 20 that includes the fourth item of deferred data. As with the messages for the previous items of deferred data, the message may have a first part that identifies the fourth item of deferred data, followed by one or more parts with the fourth item of deferred data. Each of the respective parts may be separated by a boundary, with the message concluding with a final boundary. The client device 20 may then update the page using the fourth item of deferred data. Though the embodiment shown in FIG. 5 includes four deferred items, it should be understood that this is merely an example and that envisaged embodiments may include any number of deferred items equal to or greater than 1. For example, a request may include, 1, 2, 3, 4, 5, 6, 7, 8, 9, 10, 11, 12, 13, 14, 15, 16, 17, 18, 19, 20, or more deferred items of the same or differing lengths.

At block 436, the virtual server 26 determines that all of the non-deferred and deferred items have been returned to the client device 20, generates a message closing the HTTP connection, and transmits the message to the client device 20. In some embodiments, however, the message sent to the client device 20 for the last deferred item may include a part that closes the HTTP connection. In other embodiments, the messages that are not the last message (e.g., the messages with the first, second, and third deferred items) may include an indication that there is another message coming. Accordingly, in such embodiments, there may not be a message that closes the HTTP connection, or a command in the last message that closes the HTTP session. Instead, the final message transmitted may lack an indication that a subsequent message is coming. Accordingly, the client device 20 may infer that the last message has been transmitted and close the HTTP connection.

Figure 6:
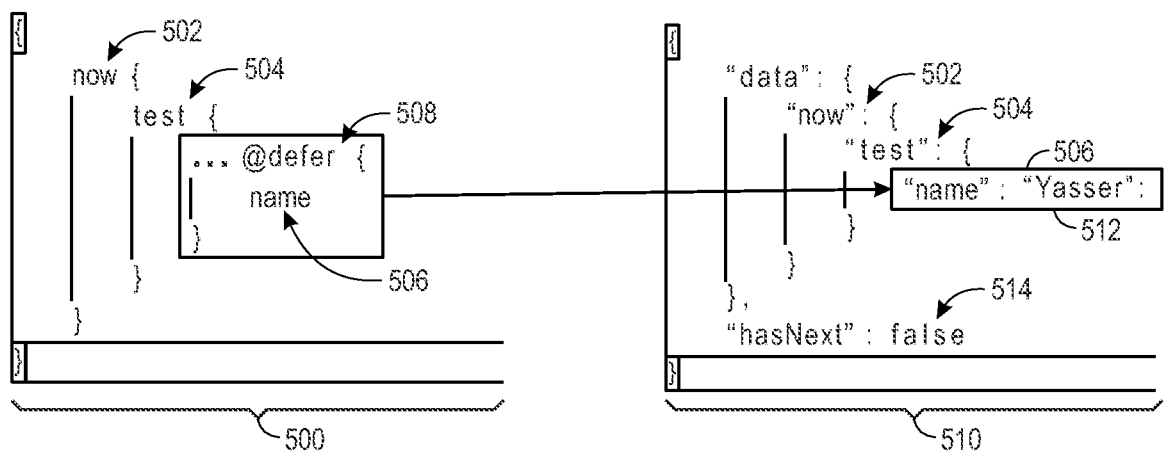
FIG. 6 illustrates example HTTP requests and responses sent between the client device and the virtual server using the defer directive, in accordance with aspects of the present disclosure.

FIG. 6 illustrates example HTTP requests and responses sent between the client device and the virtual server using the defer directive. As shown, a request 500 requests data fragments associated with "now" 502, "test" 504, and "name" 506. As shown, the "name" data fragment 506 is tagged with the defer directive 508 indicating that data for "now" 502 and "test" 504 should be retrieved and sent first, and then retrieving data associated with the "name" data fragment 506 is deferred until after the data for "now" 502 and "test" 504 is retrieved and sent. Data associated with the "name" data fragment 506 is to be retrieved and sent in a subsequent message or string of messages. In a response 510, data associated with "now" 502 and "test" 504 is retrieved first, while data associated with the "name" data fragment 506 is deferred and sent in a subsequent message 512. Further, as shown in FIG. 6, the response 510 includes an indication 514 and no subsequent messages are coming.

FIG. 7 illustrates the example HTTP requests and responses of FIG. 6 in client uniform resource locator (cURL), which is a command-line tool for transferring data using various network protocols. As shown, the request includes a header 600 that specifies multipart/mixed message response. Further, the query 602 requests data associated with "now" 502, "test" 504, and "name" 506 and tags the request for "name" 506 with the defer directive 508. Accordingly, the first message 604 received includes the data associated with "now" 502 and "test" 504, but not "name" 506 because data associated with "name" 506 was deferred. Accordingly, the subsequent message 512 includes the data associated with "name" 506.

Figure 8:
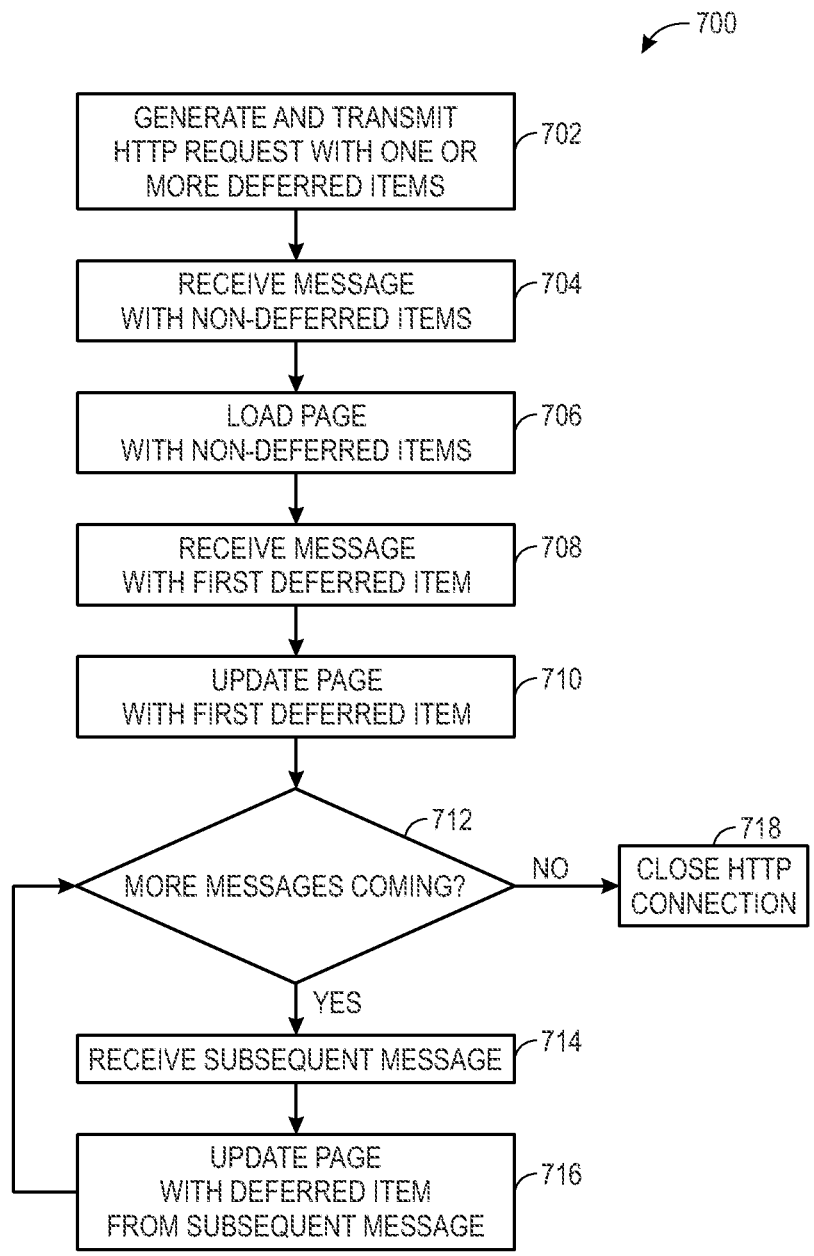
FIG. 8 is a flow chart of a process of using the defer directive from the perspective of the client device, in accordance with aspects of the present disclosure.

FIG. 8 is a flow chart of a process 700 of using the defer directive from the perspective of the client device. At 702, the client device generates and transmits an HTTP request (e.g., a GraphQL request) to a server (e.g., GraphQL server), opening an HTTP connection with the server. Creation of the HTTP request may be triggered, for example, by a user input provided via a user interface of the client device, such as clicking on a hyperlink, selecting a navigation button, providing a uniform resource locator (URL), providing a query, providing a character string to a search bar, and so forth. The HTTP request includes one or more instances of the defer directive, flagging requested items to be deferred, and specifies that the response may be one or more multipart/mixed format messages. When data is attached to multipart/mixed format messages, the message text and the attachment become separate parts of the message, separated by boundaries. If there is no attachment, the message is of a text/plain type and has only one part.

At block 704, the client device receives a multipart/mixed message from the server that includes the requested items that were not flagged as deferred. For example, the multipart/mixed message may have a first part that identifies the data, a boundary, followed by one or more parts with the attached data, and a final boundary to indicate the end of the message. In embodiments in which the attached data is separated into multiple parts, each of those respective parts may be separated by a boundary. At block 706, the client device partially loads the page using the received data associated with the non-deferred items.

At block 708, the client device receives a multipart/mixed message to the client device 20 that includes the first item of deferred data. The multipart/mixed message may or may not indicate whether more messages are on the way. At block 710, the client device updates the page based on the received data associated with the first deferred item.

At block 712, the client device determines, based on the last received message, whether or not additional messages are expected. If additional messages are expected, the process 700 proceeds to block 714 and waits to receive the subsequent message. At block 716, the client device updates the page based on the received data associated with the deferred item from the subsequent message. The process then proceeds back to block 712 and determines, based on the last received message, whether or not additional messages are expected. If no additional messages are expected, the process 700 proceeds to block 718 and the HTTP connection is closed.

Figure 9:
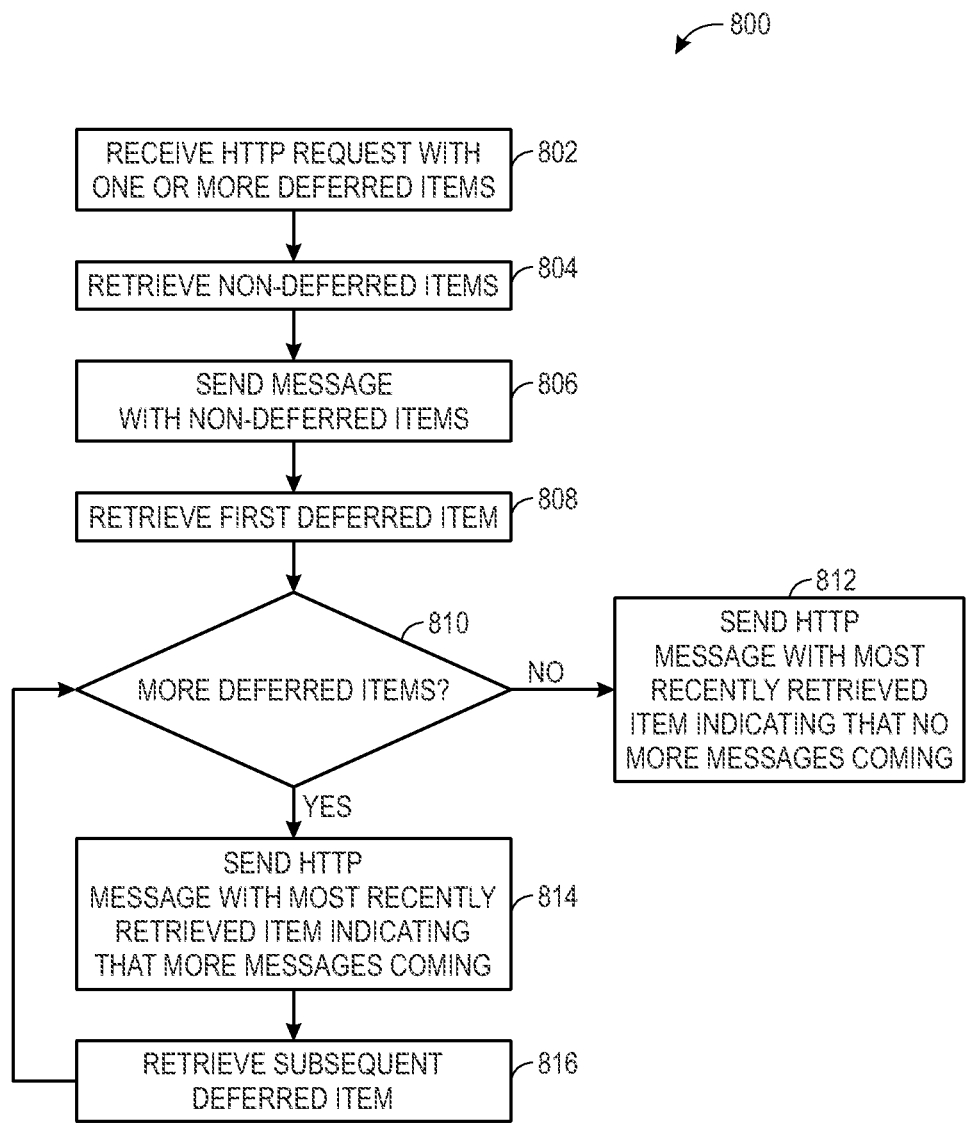
FIG. 9 is a flow chart of a process of responding to HTTP requests that utilize the defer directive from the perspective of the virtual server, in accordance with aspects of the present disclosure.

FIG. 9 is a flow chart of a process 800 of responding to HTTP requests that utilize the defer directive from the perspective of the server (e.g., GraphQL server). At block 802, the server receives an HTTP request (e.g., a GraphQL request) from a client device, opening an HTTP connection between the server and the client device. The HTTP request includes one or more instances of the defer directive, flagging requested items to be deferred, and indicates that the response may be one or more multipart/mixed format messages. The server may itself store a database, or have access to a database server that stores the database. The server parses the request, noting the instances of the defer directive and the multipart/mixed message format specification. At block 804, the server utilizes a single worker thread from a thread pool to query the database for data associated with the non-deferred items. Although GraphQL typically uses an asynchronous, multi-threaded approach to respond to requests, to prevent a small number of requests from dominating the available resources and using all of the available worker threads in the pool, a single respective worker thread is pulled from the pool and used to retrieve all of the data for a the request.

At block 806, the server transmits a message to the client device that includes the retrieved data associated with the non-deferred items. For example, the message may be a multipart/mixed message having a first part that identifies the data, a boundary, followed by one or more parts with the attached data, and a final boundary to indicate the end of the message. In embodiments in which the attached data is separated into multiple parts, each of those respective parts may be separated by a boundary.

The server utilizes the single worker thread to serially retrieve the deferred items and stream the retrieved data back to the client device. The deferred items may or may not be retrieved in the order in which they appear in the request. Accordingly, at 808, the server utilizes the single worker thread to query the database for the data associated with the first deferred item. At 810, the server determines whether there are any additional items to be retrieved. If there are no more items to be retrieved, the server proceeds to block 812 and sends a multipart/mixed message to the client device that includes the data for the most recently retrieved item and an indication that no more messages are coming. If there are additional items to be retrieved, the server proceeds to block 814 and sends a multipart/mixed message to the client device that includes the data for the most recently retrieved item and an indication that more messages are coming. At block 816, the server utilizes the single worker thread to query the database for the data associated with the next deferred item. The server returns to block 810 and determines whether there are any additional items to be retrieved. If there are additional items to be retrieved, the server proceeds back to block 814 and sends a multipart/mixed message to the client device that includes an indication that more messages are coming.

FIG. 10 is a command line interface window 900 that illustrates response times to similar GraphQL queries with and without the defer directive. As shown at 902, the time to initial response, which is the same as the time to complete the request, for a particular GraphQL query that does not utilize the defer directive is 617 milliseconds (ms). However, as shown at 904, if the defer directive is utilized in what is otherwise the same GraphQL query, the time to initial response is 234 ms. Accordingly, for this particular query, utilizing the defer directive reduces the time to initial response by more than 60%. However, the time to complete the request for the GraphQL query that utilizes the defer directive is 631 ms, which is slightly longer than the time to complete the request for the GraphQL query that does not utilize the defer directive. Accordingly, though use of the defer directive may slightly increase the time it takes to complete the request, as compared to a similar GraphQL query that does not utilize the defer directive, using the defer directive dramatically increases the time to initial response. Receiving the initial response allows the page to start loading and allows a user to interact with the page before the request has been completed, in some cases reducing the time to first interaction for the page by more than 60%. As such, use of the defer directive dramatically reduces time to first interaction for a page, while only slightly increasing, if at all, the time for the page to fully load, as compared to a query that does not use the defer directive.

The presently disclosed techniques improve time to first interaction for a page by utilizing a defer directive to defer retrieval of some of the requested data. A client device transmits an HTTP request, opening an HTTP connection with a server. The HTTP request identifies items to be retrieved and uses the defer directive to indicate that retrieval of at least one of the items is to be deferred. The server utilizes a single worker thread to retrieve the one or more non-deferred items and responds to the client device with a multipart/mixed format message that includes the retrieved data for the non-deferred items. The client device may partially load the page based on the received data for the non-deferred items. The server then utilizes the single worker thread to retrieve the deferred items in serial and stream the retrieved data associated with the deferred items to the client device via one or more respective multipart/mixed format messages as the data is retrieved. The client device may update the page with received data as subsequent messages are received. In some embodiments, the messages may include an indication of whether or not additional messages will be sent, or if the request has been completed. When all of the messages have been sent and the request has been completed, the HTTP connection is closed. By utilizing the defer directive as disclosed herein, time to first interaction for a page is greatly reduced, while total time to load the page is only slightly longer, if it is longer at all. Accordingly, because time to first interaction for the page is so much faster, using the defer directive gives a user the impression that the page is loading faster.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
a processor; and
a memory that is accessible by the processor, wherein the memory stores instructions which, when executed by the processor, cause the processor to perform operations comprising:
receiving, from a client device, a hypertext transfer protocol (HTTP) request for content, wherein the HTTP request includes:
an identification of two or more items, wherein the two or more items include a first item associated with a defer directive and a second item that is not associated with a defer directive, and
an indication that multipart/mixed format messages are acceptable by the client device; and
in response to receiving the HTTP request:
retrieving first data associated with the first item;
generating a first message based on the first data;
retrieving second data associated with the second item, and
generating a second message based on the second data associated with the second item.

2. The system of claim 1, wherein the first data and the second data are retrieved from a database.

3. The system of claim 1, wherein the first data is retrieved from a first database and wherein the second data is retrieved from a second database.

4. The system of claim 1, wherein the HTTP request includes an identification of a third item, associated with the defer directive, wherein the operations comprise:
retrieving third data associated with the third item; and
generating and transmitting a third message based on the third data.

5. The system of claim 4, wherein the third message includes an indication that no additional messages will be transmitted.

6. The system of claim 4, wherein the HTTP request includes an identification of a fourth item that is not associated with the defer directive, wherein the operations comprise retrieving fourth data associated with the fourth item, wherein the first message is generated based on the fourth data.

7. The system of claim 1, wherein the first and second messages are transmitted within a single HTTP connection.

8. The system of claim 7, wherein the first and second messages are streamed within the single HTTP connection.

9. The system of claim 1, wherein the operations comprise retrieving a single worker thread from a worker thread pool, wherein the first and second data are retrieved via the single worker thread.

10. The system of claim 1, wherein the second message comprises an indication that additional messages will be transmitted.

11. A method, comprising:
receiving, from a client device, a hypertext transfer protocol (HTTP) request for content, wherein the HTTP request comprises:
an identification of two or more items, including a first item to which a defer directive is not applied and a second item to which the defer directive is applied; and
an indication that the client device will accept multipart/mixed format messages;
in response to the HTTP request:
retrieving, from a database, first data associated with the first item;
generating a first message comprising the first data associated with the first item;
retrieving, from the database, second data associated with the second item; and
generating a second message comprising the second data associated with the second item.

12. The method of claim 11, wherein the first data is configured to enable the client device to partially render a webpage based on the first data.

13. The method of claim 12, wherein the partially rendered webpage is interactive via a user interface of the client device.

14. The method of claim 12, wherein the HTTP request comprises an identification of a third item, to which the defer directive is applied, wherein the method comprises:
retrieving, from the database, third data associated with the third item; and
generating and transmitting a third message comprising the third data associated with the third item, wherein the third data is configured to enable the client device to update the partially rendered webpage based on the third data.

15. The method of claim 14, wherein the third message comprises an indication that no more additional messages will be transmitted.

16. The method of claim 15, wherein the first, second, and third messages are streamed within the HTTP connection.

17. The method of claim 16, comprising closing the HTTP connection based on the indication that no additional messages will be transmitted.

18. The method of claim 11, wherein the HTTP request comprises a GraphQL request.

19. A non-transitory, computer readable medium comprising instructions that, when executed by a processor, cause the processor to perform operations comprising:
receiving, from a client device, a hypertext transfer protocol (HTTP) request for content, wherein the HTTP request comprises:
an identification of two or more items, including a first item to which a defer directive is not applied and a second item to which the defer directive is applied; and
an indication that the client device will accept multipart/mixed format messages;
in response to the HTTP request wherein the HTTP request comprises a GraphQL request;
opening an HTTP connection with the client device;

retrieving first data associated with the first item;
generating a first message comprising the first data associated with the first item;
retrieving second data associated with the second item; and
generating a second message comprising the second data associated with the second item.

20. The non-transitory, computer readable medium of claim 19, wherein the HTTP request comprises an identification of a third item, to which the defer directive is applied, wherein the operations comprise:
retrieving third data associated with the third item; and
generating and transmitting a third message comprising:
the third data associated with the third item; and
an indication that no additional messages will be transmitted; and
closing the HTTP connection with the client device.

* * * * *

UNITED STATES PATENT AND TRADEMARK OFFICE
CERTIFICATE OF CORRECTION

PATENT NO. : 11,856,048 B2
APPLICATION NO. : 18/052440
DATED : December 26, 2023
INVENTOR(S) : Alexander Corvino et al.

It is certified that error appears in the above-identified patent and that said Letters Patent is hereby corrected as shown below:

In the Claims

Column 16, Claim 19, Line 65, please insert --,-- after "request".

Column 16, Claim 19, Line 66, please replace ";" with --:--.

Signed and Sealed this
Thirtieth Day of April, 2024

Katherine Kelly Vidal
*Director of the United States Patent and Trademark Office*